United States Patent
Pessoa

(10) Patent No.: US 7,003,982 B2
(45) Date of Patent: Feb. 28, 2006

(54) APPARATUS FOR INTRODUCING BLOWING AIR INTO GLASS CONTAINER FORMING MACHINE MOLDS

(75) Inventor: Norman C. Pessoa, Chateauguay (CA)

(73) Assignee: O-I Canada Corp., Toronto (CA)

( * ) Notice: Subject to any disclaimer, the term of this patent is extended or adjusted under 35 U.S.C. 154(b) by 385 days.

(21) Appl. No.: 10/172,550

(22) Filed: Jun. 13, 2002

(65) Prior Publication Data
US 2003/0230115 A1 Dec. 18, 2003

(51) Int. Cl.
*C03B 9/14* (2006.01)

(52) U.S. Cl. .............. 65/261; 65/233; 65/300; 65/362

(58) Field of Classification Search ........... 65/242, 65/261, 233, 234, 300, 362, 68, 308, 320, 65/122, 79, 66, 82, 301, 81; 425/542, 562, 425/561, 564; 251/318, 149.8, 324, 325; 137/533.17, 533.21
See application file for complete search history.

(56) References Cited

U.S. PATENT DOCUMENTS

| | | | |
|---|---|---|---|
| 2,001,764 A | * | 5/1935 | Leonard ............ 175/239 |
| 2,725,683 A | | 12/1955 | Lockhart |
| 4,191,548 A | | 3/1980 | Fortner et al. |
| 4,364,764 A | | 12/1982 | Farkas et al. |
| 5,411,564 A | | 5/1995 | Bolin |
| 5,996,709 A | * | 12/1999 | Norris ............ 175/4.5 |

* cited by examiner

*Primary Examiner*—Dionne A. Walls
*Assistant Examiner*—Carmen Lyles-Irving

(57) ABSTRACT

A plunger for intermittently delivering counterblow air to a gob glass at a formidable temperature in a blank mold of an I.S. glass container forming machine being operated on the blow and blow process. The plunger comprises a fixed annular member with an enlarged recess at an inlet end and a valve seat at an upper end. The plunger has a sliding valve member with an annulus of the annular member, and the valve member has a stem portion and an enlarged valve seat portion at a free end thereof. The plunger further has a collar threadably and adjustably secured to the stem portion of the sliding valve member, and the collar, which is slidable within the recess of the annular member, has a plurality of air flow passages extending therethrough. Pressurized air is intermittently delivered to the recess of the annular member through an inlet line, which as an on/off valve therein.

1 Claim, 3 Drawing Sheets

APPARATUS FOR INTRODUCING BLOWING AIR INTO GLASS CONTAINER FORMING MACHINE MOLDS

FIELD OF THE INVENTION

This invention relates to a method of and an apparatus for introducing counterblow blowing air into glass gobs in blank molds of a glass container forming machine of the individual section (I.S.) type.

BACKGROUND OF THE INVENTION

U.S. Pat. No. 4,364,764 (Farkas et al.), the disclosure of which is incorporated by reference herein, in FIG. 1, illustrates a series of steps that are followed in producing hollow glass containers from gobs of glass at a formable temperature on a glass container forming machine of the I.S. type by a process known as the blow and blow process. In the blow and blow process as practiced on an I.S. machine, a preform of a glass container is formed in an inverted orientation, that is, with its open end down, in a first stage mold, which is often called a blank mold. The preform, which is often called a blank or a parison, is then transferred by an inverting operation through an arc of 180° into a second stage mold, which is often called a blow mold, where the preform is blown into its final configuration. View C of FIG. 2 of the '764 patent illustrates a step in the blow and blow process that is described as the counterblow step, a step in which blowing air is injected into a parison after the parison is properly settled at the bottom of the blank mold.

U.S. Pat. No. 4,191,548 (Fortner et al.), the disclosure of which is also incorporated by reference herein, discloses specific apparatus for introducing counterblow air into a glass preform in a blank mold of a I.S. machine that is operated on the blow and blow process.

Heretofore, counterblow air for use in the blow and blow process as practiced on an I.S. machine has been introduced into a gob of glass in the I.S. forming machine blank mold through a plunger that reciprocates with respect to the mold, and the glass gob therein that is to be blown into the desired shape of a parison, the counterblow air being blown only when the plunger is in its down position. This step is taught, for example, by the aforesaid Fortner et al. '548 patent at column 5, lines 49–57. The step of withdrawing the plunger during introduction of counterblow air can, however, lead to the distortion of the "corkage" of the finish portion of the parison, as the term "corkage" is used in the aforesaid '548 patent.

BRIEF DESCRIPTION OF THE INVENTION

To avoid the aforesaid and other problems associated with the introduction of counterblow air into a glass gob to be blown into a parison in a blank mold of an I.S. glass container forming machine, there is provided a counterblow air introduction plunger that need not, and does not, reciprocate with respect to the gob and the mold during the introduction of counterblow air through the plunger. The plunger of the present invention has a non-reciprocating annular member that is positioned beneath the blank mold of the I.S. machine, and it also has a sliding valve member that reciprocates with respect to the annular member. The sliding member has a thin stem with an outwardly expanding frustoconical end that seats against a frustoconical surface of the annular member when no counterblow air is passing through the plunger. The valve also has an annular collar that is threadably secured to the stem of the sliding member, and the collar has a circumferential plurality of air passages passing therethrough. The collar slides within a recess of the annular member, to which blowing air is intermittently introduced, and is pressurized to unseat the frustoconical end of the sliding member from the frustoconical seat of the annular member to permit the blowing air to pass into the gob only when the recess of the annular member is pressurized. Upon depressurization of the recess in the annular member, the sliding member will return, by gravity, to its seated position. In this way, the plunger remains in contact with the finish of the parison that is being blown throughout the counterblow step, and thereby avoids problems of distortion of the corkage of the parison finish that previously could occur during the counterblow step when proceeding by conventional teachings with respect to counterblowing of glass parisons.

Accordingly, it is an object of the present invention to provide an improved method of, and an apparatus for, introducing counterblow air into a gob of glass in a blank mold of an I.S. glass container forming machine. More particularly, it is an object of the present invention to provide a method and an apparatus of the foregoing character in which it is unnecessary to withdraw a counterblow air introduction plunger with respect to other structure of the blank mold during the counterblow air introduction step, to thereby avoid distortion of the corkage of the finish of the parison that is being formed in the blank mold.

For a further understanding of the present invention and the objects thereof, attention is directed to the drawing and the following brief description thereof, to the detailed description of the invention and to the appended claims.

DETAILED DESCRIPTION OF THE INVENTION

Figure 1:
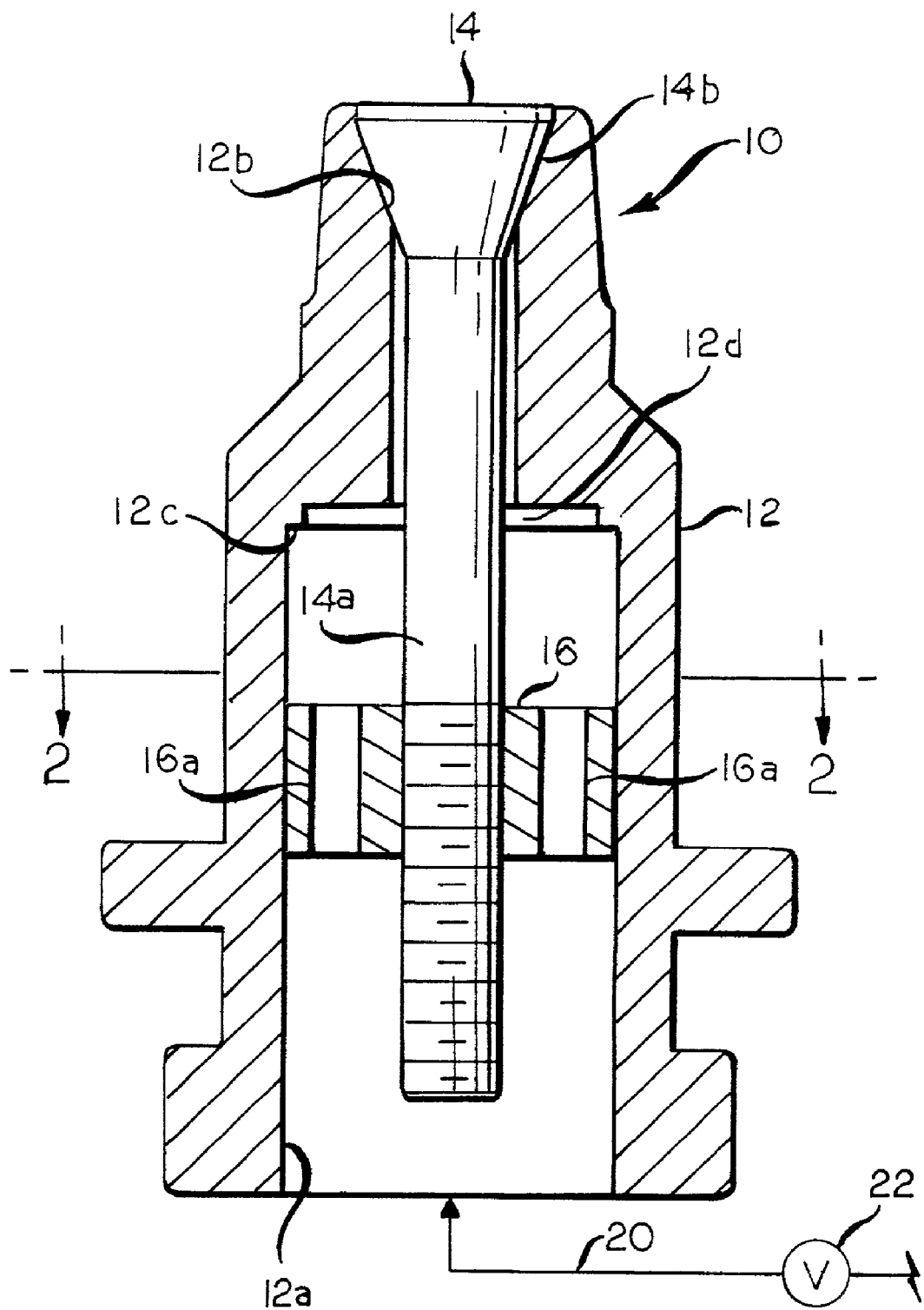
FIG. 1 is a partly schematic, elevational view, in cross-section and in a first condition of its operation, of a plunger according to a preferred embodiment of the present invention for introducing counterblow air into a blank mold of an I.S. glass container forming machine.
Figure 2:
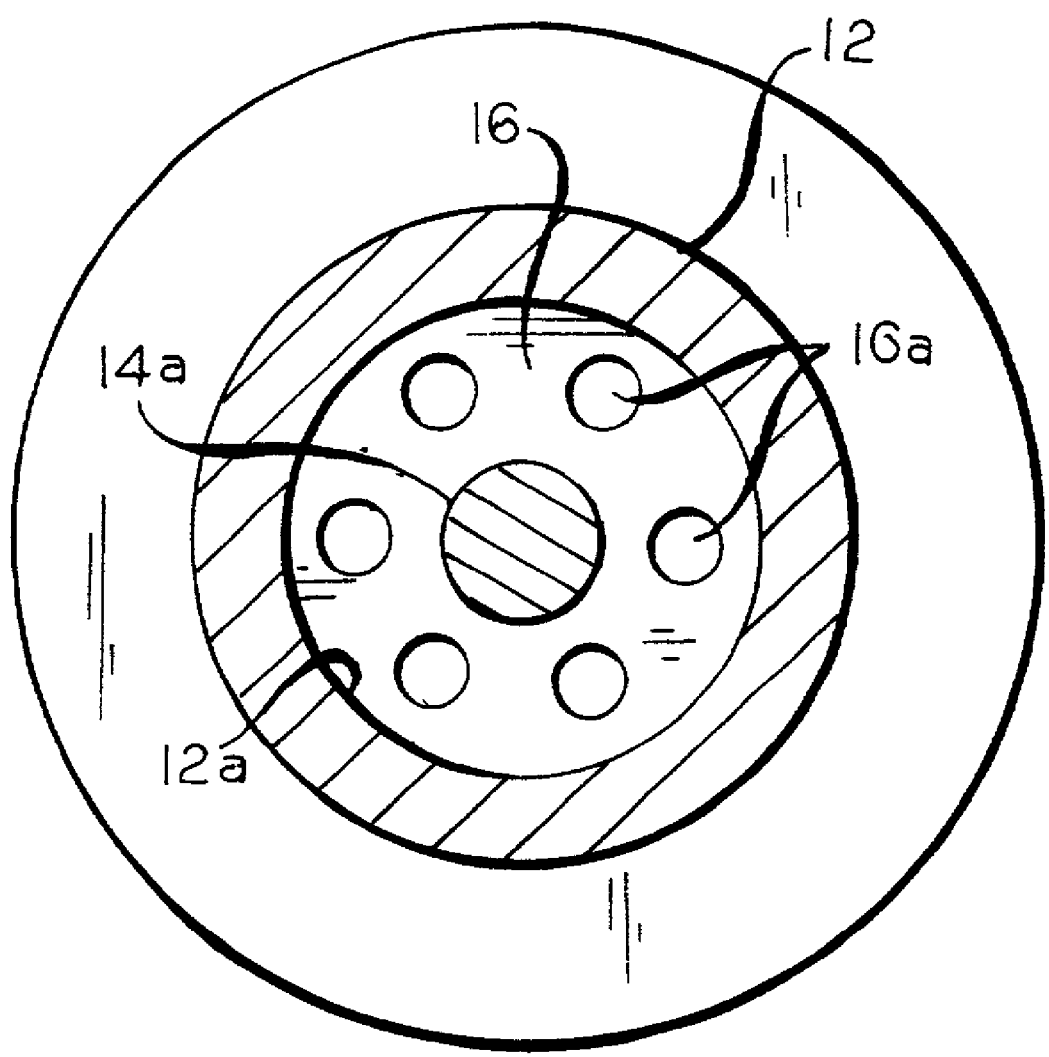
FIG. 2 is a sectional view taken on line 2—2 of FIG. 1.

A counterblow air introduction plunger according to the preferred embodiment of the present invention is generally indicated by reference numeral 10. The plunger 10 is made up of an annular housing member 12, which does not reciprocate in operation with respect to a blank mold of an I.S. machine (not shown), a valve member 14, which, in operation, slidingly reciprocates relative to the annular member 12 along a longitudinal central axis of the annular member 12, and a collar 16, which is secured to a stem portion 14a of the valve member 14 to reciprocate therewith. The collar 16 moves slidingly to and fro within an enlarged recess portion 12a at an inlet end of the annular member 12, and the collar 16 has a circumferentially spaced-apart plurality of fluid flow passages 16a extending therethrough, for purposes that will be hereinafter described more fully.

The valve member 14 also has an upwardly extending, enlarged frustoconical portion 14b at is upper free end, and, in a first position of the valve member 14, as shown in FIG. 1, the portion 14b seats against an upper, upwardly expanding, frustoconical portion 12b of the annular member 12 to block fluid flow through the plunger 10. The travel of the valve member 14 with respect to the annular member 12 is limited by the position of the collar 16 on the stem 14a of the valve member 14, because the collar 16 cannot travel beyond a position in contact with a radial shoulder 12c at an upper end of the recess 12a of the annular member 12. The recess 12a of the annular member 12 further has a reduced diameter portion 12d positioned axially inwardly of the shoulder 12c for purposes that will be hereinafter described more fully.

Figure 3:
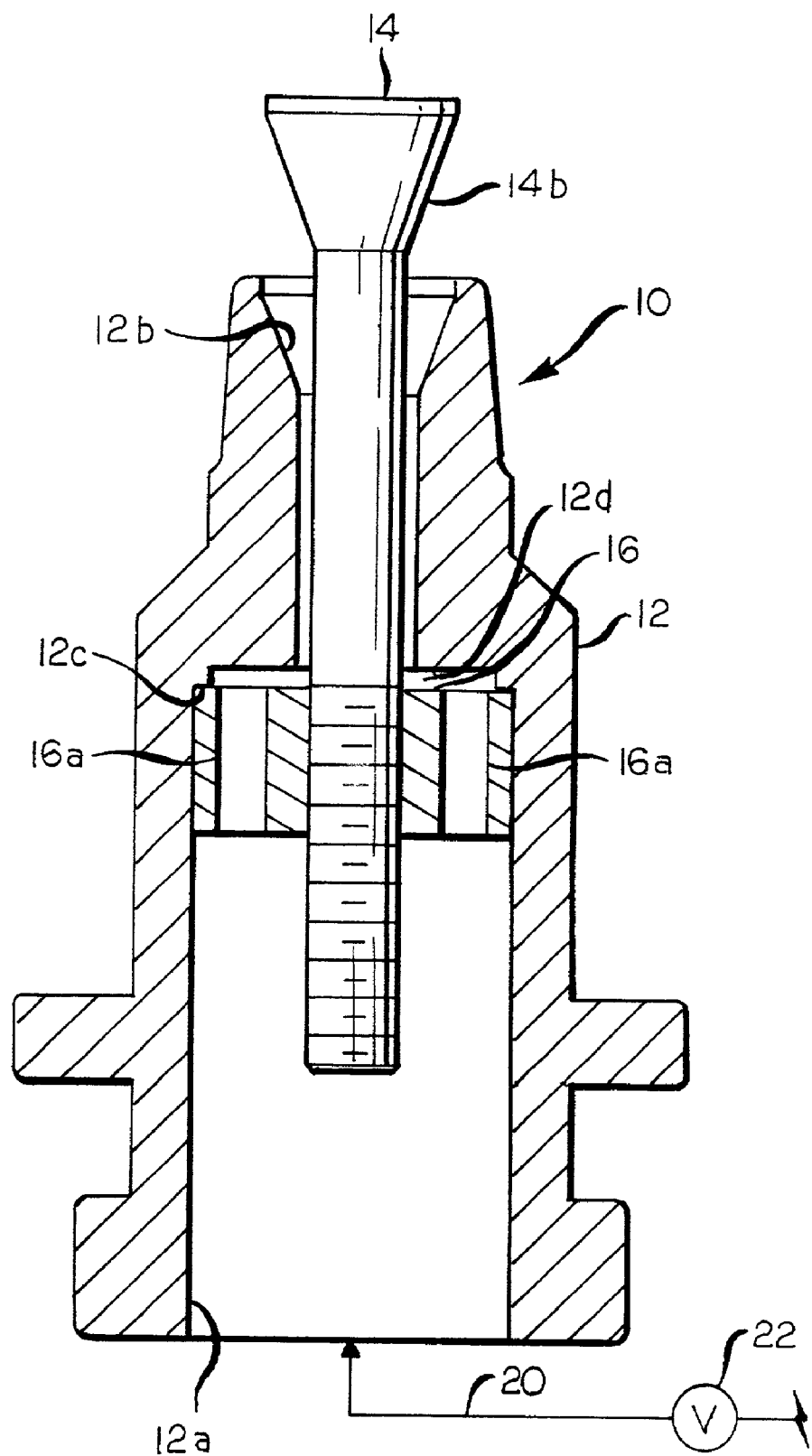
FIG. 3 is a view like FIG. 1 showing the plunger depicted therein in a different condition of its operation.

Counterblow air is intermittently delivered to the recess 12a of the annular member 14 through an inlet line 20, which is shown schematically, the air inlet line 20 having an on/off valve 22 therein to control the timing of the flow of the counterblow air to the annular member 12. When the recess 12a is pressurized by the flow of counterblow air through the inlet line 20, the pressure therein will pressurize an underside of the collar 16, to cause the collar 16 and the valve member 14 jointly to elevate with respect to the annular member 12, as shown in FIG. 3. This will then permit pressurized air from the recess 12a to flow through the passages 16a, and thereafter to escape in an annular gap between the portion 14b of the valve member 14 and the valve seat 12b of the annular member 12 to counterblow a gob of glass at a formable temperature in the blank mold with which the plunger 10 is associated. Upon the closing of the valve 22, the recess 12a will become depressurized, and this will permit the valve member 14 and the collar 16 to jointly return, by gravity, from the FIG. 3 position to the FIG. 1 position, whereupon the portion 14b of the valve member 14 will be seated against the valve seat 12b of the annular member 12 to block further air flow through the annular member 12. To control the distance by which the valve member 14 may rise with respect to the annular member 12, the collar 16 is threadably secured to an externally threaded portion 14c of the stem portion 14a of the valve member 14, so that the collar 16 will engage the shoulder 12a of the annular member 12 at an earlier or later position in the travel of the valve member 14 with respect to the annular member 12, as desired. In that case, any pressurized air remaining in the recess 12a of the annular member can escape into the reduced diameter portion 12d through the passages 16a and from there outwardly from the plunger 10 through an annulus between the valve portion 14b of the valve member 14 and the valve seat 12b of the annular member 12.

The annular member 12, the valve member 14 and the collar 16 of the plunger 10 are each formed of a suitable metallic material, preferably a heat-resistant grade of steel in view of the high temperatures that prevail in a region near blank molds of an I.S. machine. Such material has sufficient density to provide sufficient mass to the subassembly that includes the valve member 14 and the collar 16 to return it from the FIG. 3 position to the FIG. 1 position when the recess 12a is depressurized, without the need for a return spring between an upper face of the collar 16 and the shoulder 12c of the annular member 12.

Because the annular member 12 stays in position during the passage of counterblow air therethrough, problems of distortion of the corkage in a finish portion of the parison being formed by the counterblow air, which characterized prior art counterblow air introduction systems that relied on a retractable plunger to permit counterblow air to flow into a gob being formed into a parison in a blank mold, are avoided.

Although the best mode contemplated by the inventor for carrying out the present invention as of the filing date hereof has been shown and described herein, it will be apparent to those skilled in the art that suitable modifications, variations, and equivalents may be made without departing from the scope of the invention, such scope being limited solely by the terms of the following claims and legal equivalents thereof.

What is claimed is:

1. Apparatus for introducing counterblow air into a gob of glass at a formable temperature in a blank mold of an I.S. glass container forming machine, said apparatus comprising:

an annular member, said annular member being non-reciprocating with respect to the blank mold, having a longitudinal central axis extending vertically, an enlarged recess at a lowermost end and an upwardly facing valve seat at an uppermost end;

a sliding valve member, said sliding member being positioned within an annulus of said annular member, being reciprocatable with respect to said annular member and having a stem with an enlarged valve portion at an uppermost end, said enlarged valve portion being seated against said valve seat of said annular member in a first position of said valve member with respect to said annular member and being unseated with respect to said valve seat in a second position of said valve member;

an annular collar secured to said stem of said valve member and reciprocatable with said valve member, said collar being positioned in said recess of said annular member and having at least one air flow passage extending therethrough;

means for intermittently delivering pressurized air to said recess to act against an underside of said collar to urge said valve portion of said valve member from said first position to said second position, said valve member being adapted to return to said first position when said recess is depressurized; and, said recess further has a portion of reduced lateral extent spaced axially inwardly from said radial shoulder to permit fluid remaining in said recess when said collar engages said radial shoulder to escape.

* * * * *